(12) United States Patent
Gatti (10) Patent No.: US 11,572,276 B2
(45) Date of Patent: Feb. 7, 2023

(54) PLANT FOR THE CONTROLLED PRODUCTION OF MONOCHLORAMINE FOR SANITIZING FLUIDS

(71) Applicant: ACEL S.R.L., Parma (IT)

(72) Inventor: Marco Gatti, Parma (IT)

(73) Assignee: ACEL S.R.L., Parma (IT)

( * ) Notice: Subject to any disclaimer, the term of this patent is extended or adjusted under 35 U.S.C. 154(b) by 646 days.

(21) Appl. No.: 16/332,239

(22) PCT Filed: Sep. 14, 2017

(86) PCT No.: PCT/IB2017/055570
§ 371 (c)(1),
(2) Date: Mar. 11, 2019

(87) PCT Pub. No.: WO2018/051271
PCT Pub. Date: Mar. 22, 2018

(65) Prior Publication Data
US 2019/0276312 A1  Sep. 12, 2019

(30) Foreign Application Priority Data

Sep. 14, 2016  (IT) .......................... 102016000092675

(51) Int. Cl.
*C02F 1/76*      (2006.01)
*C01B 21/09*     (2006.01)
*B01F 27/05*     (2022.01)

(52) U.S. Cl.
CPC ............ *C01B 21/091* (2013.01); *B01F 27/05* (2022.01); *C02F 1/76* (2013.01); *C02F 2209/003* (2013.01); *C02F 2209/005* (2013.01)

(58) Field of Classification Search
None
See application file for complete search history.

(56) References Cited

U.S. PATENT DOCUMENTS 2,438,204 A    3/1948  Castner
3,149,912 A *  9/1964  Kise .................... C01B 21/1427
                                                          423/388
(Continued)

FOREIGN PATENT DOCUMENTS

EP    1734008 A2 * 12/2006 ................ C02F 1/72
EP    2468684 A1    6/2012
(Continued)

OTHER PUBLICATIONS

"Chloramines 101", https://www.tceq.texas.gov/assets/public/permitting/watersupply/pdw/Chloramines101_for_WEB.pdf, Texas Commission on Environmental Quality (TCEQ) (Oct. 2015). (Year: 2015).*

(Continued)

*Primary Examiner* — Chester T Barry
(74) *Attorney, Agent, or Firm* — Shuttleworth & Ingersoll, PLC; Timothy J. Klima (57) ABSTRACT

A plant and relative controlled production method of monochloramine; inside a reactor, at least a means or group creates and/or maintains a turbulent regime during the production reaction of monochloramine; at the end, at least a post-dosing means performs a further dosage of reagent directly in the concentrated solution of monochloramine produced directly in reactor or on the transfer piping or directly into the storage tank.

7 Claims, 3 Drawing Sheets

(56) References Cited

U.S. PATENT DOCUMENTS

| | | | |
|---|---|---|---|
| 3,254,952 A | 6/1966 | Walter | |
| 5,976,386 A * | 11/1999 | Barak | C02F 1/50 210/101 |
| 6,315,950 B1 | 11/2001 | Harp et al. | |
| 9,388,044 B2 | 7/2016 | Gupta et al. | |
| 9,896,360 B2 * | 2/2018 | Garusi | A01N 59/00 |
| 10,155,662 B2 * | 12/2018 | Gatti | C01B 21/091 |
| 11,116,222 B2 * | 9/2021 | Barak | A01N 59/00 |
| 2003/0045758 A1 * | 3/2003 | Flanagan | B01J 19/0046 568/727 |
| 2004/0221902 A1 * | 11/2004 | Aubry | G05D 11/132 137/826 |
| 2005/0211643 A1 | 9/2005 | Phillips et al. | |
| 2006/0124558 A1 | 6/2006 | Kouame | |
| 2007/0049642 A1 * | 3/2007 | Singleton | A01N 59/00 514/612 |
| 2009/0173697 A1 | 7/2009 | Axtell et al. | |
| 2011/0278173 A1 | 11/2011 | Gunzinam et al. | |
| 2012/0145630 A1 | 6/2012 | Ogiwara et al. | |
| 2013/0206605 A1 * | 8/2013 | DiMascio | C25B 9/19 205/338 |
| 2013/0333800 A1 * | 12/2013 | Cocchi | B67C 3/007 141/192 |
| 2014/0105808 A1 | 4/2014 | McNeel et al. | |
| 2014/0356231 A1 * | 12/2014 | Rico-Munoz | A61L 2/18 422/37 |
| 2015/0264952 A1 * | 9/2015 | Wild | A61P 3/10 514/23 |
| 2015/0367315 A1 | 12/2015 | Barak | |
| 2016/0115028 A1 | 4/2016 | Gatti et al. | |
| 2016/0362318 A1 | 12/2016 | Simmons | |
| 2017/0252705 A1 * | 9/2017 | Song | B01D 69/02 |
| 2017/0311633 A1 * | 11/2017 | Heidebach | A23L 27/84 |

FOREIGN PATENT DOCUMENTS

| | | |
|---|---|---|
| EP | 3015424 A1 | 5/2016 |
| JP | 2013022541 A | 2/2013 |
| WO | 2013051192 A1 | 4/2013 |

OTHER PUBLICATIONS

Lenntech, "Disinfectants Chloramine," https://web.archive.org/web/20170925145832/http://www.lenntech.com/processes/disinfection/chemical/disinfectants-chloramines.htm (archived internet page from 2017) (Year: 2017).*

Italian Search Report dated Jul. 27, 2017 from related IT App No. IT102016000092675.

Japanese Office Action dated Oct. 1, 2019 from related JP App No. 2015-211395.

U.S. Office Action dated Feb. 1, 2018 from related U.S. Appl. No. 14/923,754.

U.S. Office Action dated Sep. 5, 2019 from related U.S. Appl. No. 16/189,852.

European Search Report dated Feb. 22, 2016 from related EP App No. EP15191748.

International Search Report and Written Opinion dated Dec. 15, 2017 for counterpart PCT Application No. PCT/IB2017/055570.

European Office Action dated Jul. 15, 2022 from counterpart EP App 17784389.3.

* cited by examiner

11: ACISAN-C INLET
5: ACISAN-AM INLET
10: H2O INLET
30: SOLUTION OUTLET
40: ORIFICE FOR STIRRER
50: ORIFICE FOR LEVEL PROBE

PLANT FOR THE CONTROLLED PRODUCTION OF MONOCHLORAMINE FOR SANITIZING FLUIDS

This application is the National Phase of International Application PCT/162017/0555570 filed Sep. 14, 2017 which designated the U.S.

This application claims priority to Italian Patent Application No. IT102016000092675 filed Sep. 14, 2016, which application is incorporated by reference herein.

The present invention relates to the field of fluid treatment methods by means of monochloramine and relative production plant.

According to the invention, monochloramine is obtained by a controlled reaction process.

Once monochloramine has been produced, in solution and in a controlled reaction environment, it is added to the fluid to be sanitized.

Advantages:
the production in a controlled environment, particularly with the use of osmotized water alone for the preparation of the solution in a suitable reactor, configured according to the fluid-dynamic reaction conditions described below, ensures a sanitizing product not influenced by the quality of the water used for the preparation reaction of the monochloramine solution,
the subsequent storage and dosing of the monochloramine solution produced in a special storage tank allows the use thereof in many applications.

PRIOR ART

The systems existing on the market for the production of monochloramine as a molecule and the consequent use on water circuits, such as water intended for human consumption, are manifold.

For years, also in Italy, monochloramine is used in some aqueducts of Sardinia.

A recent application, appeared on the market, provides for the dosing of monochloramine in sanitary circuits as a bactericidal agent.

Specifically, the production is carried out by dosing the basic chemical products (hypochlorite solution+ammonium salt solution) directly on a portion of water taken from the sanitary circuit itself intended for the users, carried into the machine and then, on the secondary flow, injecting the reagent chemical products; therefore, the reaction does not take place in a controlled environment, but is subject to different variables. Monochloramine is therefore produced by reaction on the same flow of water taken from the sanitary circuit without any pretreatment and subsequently re-introduced.

Both the claimed system and process provide for the formation and the dosage of the monochloramine molecule in a completely different manner, considering it appropriate to separately produce a concentrated solution of pure monochloramine without any influence from the circuit within which subsequently the solution is to be dosed.

In this way, the monochloramine obtained from the process and with the subject system maintains the production purity irrespective of the water quality of the circuit intended for the users that must be sanitized and, even more, the production of the molecule occurs in a controlled environment.

DESCRIPTION AND ADVANTAGES OF THE INVENTION

The object of the present invention is to produce high purity concentrated monochloramine by means of a controlled reaction process.

In particular, the plant and the apparatus include:
connecting means for the inlet of the osmotized water used for the reaction solution, with control and adjustment of its pressure; possibly, in the case where the plant is not able to receive osmotized water, it is provided for the passage through an additional reverse osmosis plant (filtration on osmotic membranes), configured to obtain water osmotized only in the portion intended for the reaction,
means for dosing the chemical reagents, i.e. by means of dosing pumps such as peristaltic pumps, and the controlled feeding of the reagents in a dedicated reactor with said osmotized water, the latter being used as the reaction solvent,
means configured to create and maintain a turbulent regime at least inside the reactor and at least during the reaction and production of monochloramine; specifically said means are configured to stir the solution contained within the reactor, for example by means of an electromechanical mixer;
means adapted to perform a further post-dosing step/ activity of one of the reagents involved in the reaction, in detail hypochlorite; the post-dosing takes place in this way directly into the concentrated solution of monochloramine previously produced.

Said post-dosing step, performed through proportional or timed or manual system, may be:
set and defined a priori as a function of the ratios of reagents and the possible amount of excess ammonium remained following the reaction and which is present together with the monochloramine solution, or
actuated by analysis tools positioned on the fluid to be sanitized or sanitized.

According to a further aspect of the invention, a second turbulence generating means may be inserted inside the storage tank to facilitate the reaction of the reagent added to the monochloramine solution produced.

The system is also provided with a control system in signal connection with the above components and configured to perform at least the following steps:
dosing the reagents and the osmotized water in the reactor, activating the dosing pumps,
generating turbulence,
controlling/activating (at the end of production reaction of monochloramine) the additional post-dosing of reagent to the monochloramine produced; said dosing being carried out directly into the storage tank or in dynamic conditions during the passage from the reactor to the tank itself.

Finally, the system is configured to manage the dosing of the concentrated solution in the fluid to be sanitized, for example through one or more dosing pumps.

Finally, additional sensors and analysis means of the sanitized fluid will be preferably present downstream, with the detection of characteristic parameters in signal connection with the control system so as to enable the automation of the dosing of the concentrated monochloramine solution produced.

ADVANTAGES

Due to the inclusion of turbulence generating means inside the reactor and/or on the storage tank it is possible to obtain a good and efficient mixing between the reagents involved in the reaction and the osmotized water intended for the production of the monochloramine solution.

Due to the introduction of means for the further dosing of hypochlorite in the reactor (after the reaction) and/or in the storage tank or in the connecting pipeline between said reactor and said storage tank it is possible to increase the yield of production of monochloramine by exploiting any excess ammonium converting it into further monochloramine.

Thus, regardless of the source of supply of the structure where the machine is installed, the reaction is always guaranteed and the monochloramine produced will have the same characteristics, preventing the formation of byproducts.

Said objects and advantages are all achieved by the plant for producing monochloramine and process thereof, object of the present invention, which is characterized by the appended claims.

BRIEF DESCRIPTION OF THE FIGURES

The above and other features will be more apparent from the following description of some of the configurations, illustrated purely by way of example in the accompanying drawings.

GENERAL CHEMICAL REMARKS

It is well known that in order to obtain monochloramine, a reaction of ammonia and hypochlorite is required as follows:

$$NH_3(water) + HOCl \rightarrow NH_2Cl + H_2O$$

Therefore, there will be two incoming reagents, which for convenience will be named first reagent A and second reagent B; said reagents, as a result of their reaction, produce monochloramine and water.

The first reagent A of the present invention is hypochlorite stabilized at a certain concentration, hereinafter referred to as ACISAN-C.

The second reagent B contains ammonium salt form, preferably in solution with other substances to achieve a reasonable pH value and a defined concentration of ammonia.

In more detail, the second reagent B is named ACISAN-AM and, specifically:

ACISAN-AM 1, obtained with ammonium chloride and ACISAN-AM 2, obtained with ammonium sulfate.

Hereinafter, for simplicity, they will be generically referred to as ACISAN AM.

As regards the ratio between the reagents, the formula used is as follows:

The basic reaction for the production of monochloramine is:

$$NH_3 + HClO = NH_2Cl + H_2O$$

where:
$NH_2Cl$ is monochloramine
$NH_3$ is ammonia
HClO is hypochlorous acid obtained by hydrolysis of sodium hypochlorite by the following reaction:

$$NaClO + H_2O = HClO + NaOH$$

In the case of the present invention, the second reagent B, namely ACISAN AM contains $NH_4Cl + NaOH + NH_3$, and ACISAN AM 2 contains $(NH_4)_2SO_4 + NaOH + NH_3$, therefore the overall reaction, in addition to the basic formulation above, is also composed by the following reaction using:

ACISAN AM 1

$$NH_4Cl + NH_3 + NaOH + 2HClO = 2NH_2Cl + NaCl + 3H_2O$$

ACISAN AM 2

$$(NH_4)_2SO_4 + NH_3 + 2NaOH + 3HClO = 3NH_2Cl + Na_2SO_4 + 5H_2O$$

As mentioned, for the production of monochloramine, the plant uses osmotized water C for the reaction solution directly, if available, otherwise obtained with an additional reverse osmosis plant (osmotic membrane filtration to obtain the required features); a control system further regulates the flow and pressure of said osmotized water C intended for the reaction solution.

The reaction takes place in a dedicated reactor 1 for obtaining a pure monochloramine solution that hereinafter is referred to as first solution of concentrated monochloramine M.

The reaction is completed with a forced mixing system, hereinafter referred to as mixing means 2, able to stir the reaction solution up to reaching a turbulent regime; the mixing means 2 are insertable into reactor 1.

The dosage in osmotized water C, in proper proportions of chemicals, first and second reagent A and B (ACISAN C and ACISAN AM) contained in dedicated tanks 6 and 7, creates a first solution of concentrated monochloramine M in output from the reactor.

To prevent the potential production of harmful byproducts resulting from an overdose of hypochlorite, or first reagent A, it is provided to operate with excess ammonium.

In order to optimize the reaction, increasing the concentration of monochloramine produced, said excess ammonium is recovered.

The method in fact includes injecting in a storage tank 12 or in the connection of reactor 1 with the storage tank 12 a further amount of first reagent A (ACISAN-C, hypochlorite) used for the production of monochloramine; in that regard, the control system is in signal connection with at least one dedicated dosing system or group. The excess ammonia is converted into additional monochloramine.

The first solution of concentrated monochloramine M produced in reactor 1 exits from said reactor 1 together with an ammonium excess; downstream of reactor 1, by reacting said ammonium excess with a further amount of first reagent A, further monochloramine is produced, resulting in a final solution of concentrated monochloramine M1.

Said final solution of concentrated monochloramine M1 has a concentration generally higher than or equal to the first solution of concentrated monochloramine M.

When the monochloramine molecule has been produced, it has a stability that allows being injected into a fluid 15 to be sanitized, or in the circuit or system to be sanitized. In particular, the treated fluid may be fluid intended either for human use or other civil or industrial or zootechnical uses and regardless of whether it is hot or cold water or other fluid.

Basically, the process is managed by at least one control system and consists of the following production steps of the first solution of concentrated monochloramine M:

a. Dosing the second reagent B and the osmotized water C in reactor 1,

Dosing the second reagent B takes place through a first orifice 5; said dosing of component ACISAN-AM (ACISAN-AM 1 or ACSAN-AM2) takes place simultaneously to the entrance of the osmotized water C in the reactor, second orifice 10.

The feeding of the second reagent B is done by the dosing pump 8 (e.g. peristaltic pump) controlled by a control and management system, such as a PLC, in the amount previously determined.

b. Once the defined time has elapsed or the preset level has been reached, while osmotized water C continues to flow to reactor 1, the first reagent A or ACISAN-C is introduced through a third orifice indicated with 11; the first reagent A is introduced by pump 9 (for example peristaltic) controlled by PLC until reaching a preset level or after a settable time;

c. once the predefined time has elapsed or the preset level has been reached, the previously osmotized water C continues to flow to the reactor up to reaching the final level, which may be measured by a level sensor.

During at least one of the above steps, preferably also during the time of preparation and production of the first solution of concentrated monochloramine M of steps a, b and c, a turbulence of the solution is created inside reactor 1 by keeping the mixing means 2 (e.g. electromechanical) active.

According to an aspect of the invention, the intervention times of said mixing means 2 can also be continued after step c.

The osmotized water C acts as a dilution and due to the presence of the mixer and to the internal structure of reactor 1, the first and second basic reagent A and B described above (ACISAN-C, ACISAN-AM) takes place.

After the production of the first solution of concentrated monochloramine M in reactor 1, the management and control system controls a solenoid valve EV2, so that the solution of monochloramine and ammonium excess is flushed down into the lower storage tank 12.

Once the reaction has regularly taken place, through a post-dosing or post-treatment system it is possible to control the further injection of hypochlorite, i.e. the first reagent A:

during the transfer in the storage tank 12 following the opening of the solenoid valve EV2 on a transfer piping 13 with due mixing or directly in the storage tank 12 on which a mixing device 21 can be inserted.

The above further dosing of the first reagent A (ACISAN-C) is aimed at increasing the efficiency of reaction, which can take place in excess of ammonium conducted analytically.

The first solution of concentrated monochloramine M produced in reactor 1, obtained by sequential mixing of the second reagent B, ACISAM AM and then of the first reagent A, ACISAN C, in osmotized water C, has a high concentration of monochloramine.

The concentration of monochloramine M produced is corrected if necessary with the second post-dosing of hypochlorite or first reagent A, which may occur in the transfer piping 13 or, once stored, in the storage tank 12, whose level is controlled by a level sensor.

Figure 1:
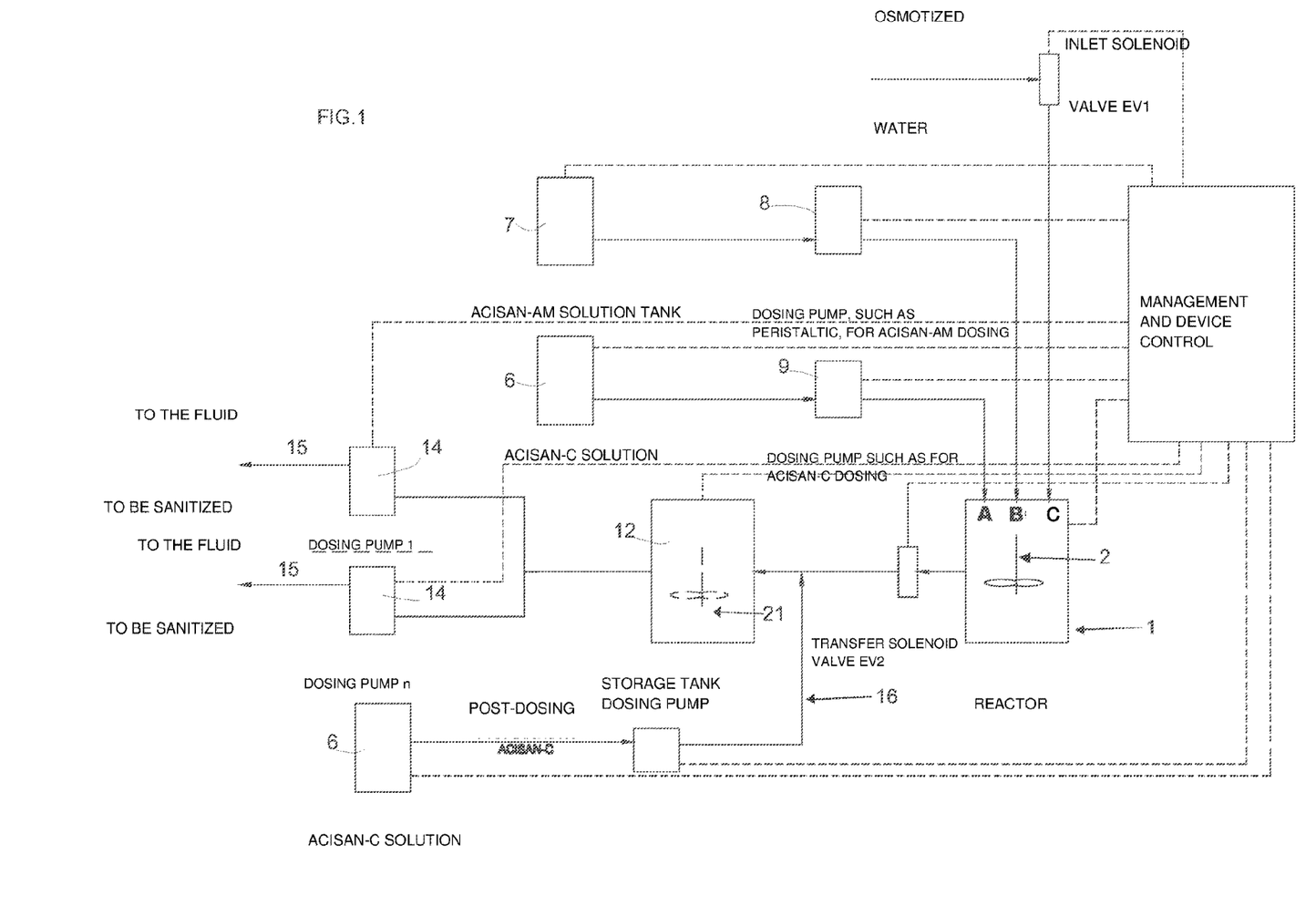
FIG. 1: shows the operating scheme of the subject plant and process.
Figure 2:
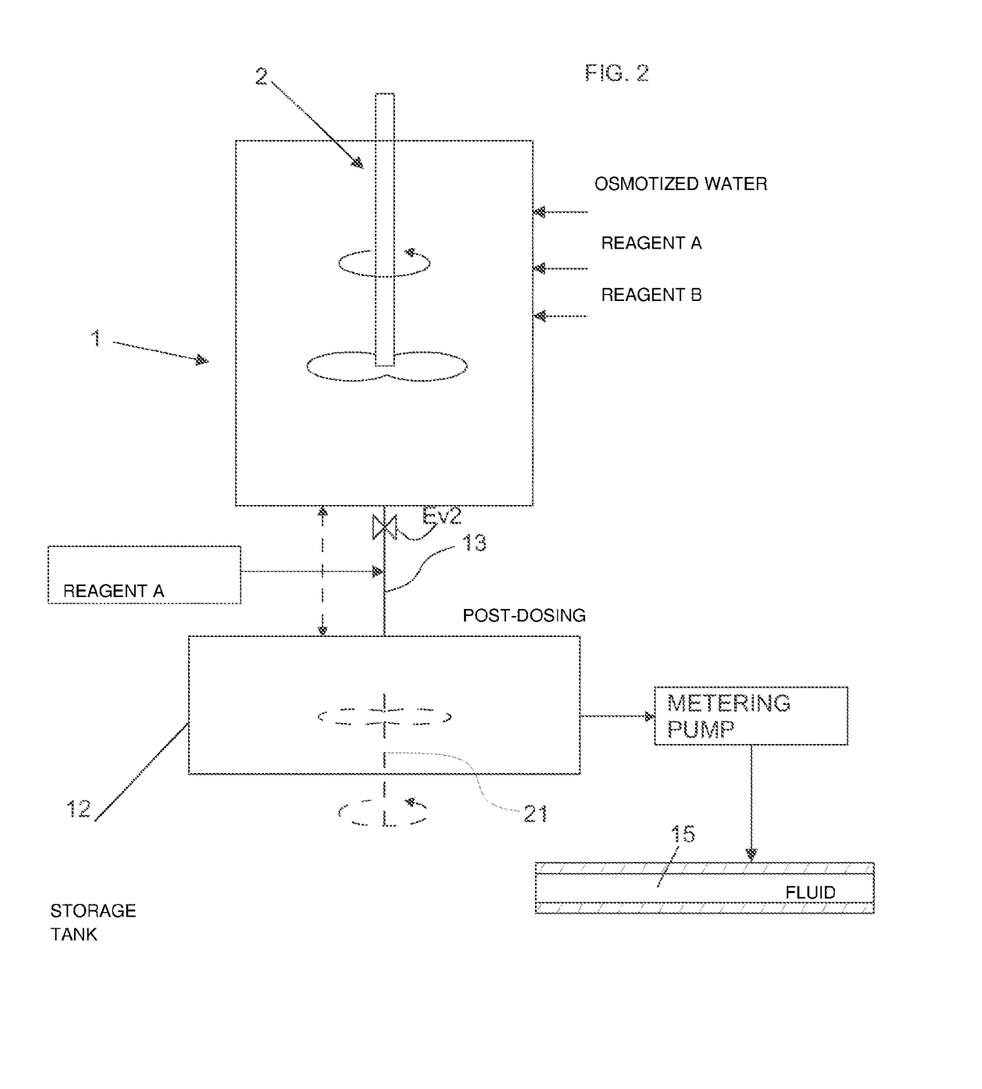
FIG. 2: schematically shows the operation of the plant, in particular reactor, tank and post-dosing function.

As shown by FIGS. 1 and 2, the mixing device 21 may be placed into the storage tank 12 in order to create a turbulence in the monochloramine solution contained therein, which will be placed under stirring during or after the post-dosing of hypochlorite or first reagent A.

The final solution of concentrated monochloramine M1 is thus obtained, having a concentration generally higher than or equal to the first solution of concentrated monochloramine M.

With the process of formation of the first solution of concentrated monochloramine M and of the final solution of concentrated monochloramine M1 described herein, the reaction occurs at a regulated pH level falling in a range of between 7 and 12.5.

At this point, the final solution of concentrated monochloramine M1 stored is ready to be dosed to fluid 15 to be sanitized.

The dosing to fluid 15 to be sanitized occurs through dosing system (e.g. dosing pumps) operating according to the PID and/or proportional—volumetric or manual logic.

With a proportional-volumetric dosing logic, the dosing of monochloramine takes place through dosing pump that injects depending on the signal coming from a flow detector. The signal is proportional to the quantity of water passing from the flow detector.

With PID dosing logic, the dosing takes place by a dosing pump that receives, for example, from a management and control system or a further control unit external or internal to the pump, a signal of representative quantities of values such as: concentration of monochloramine found in the conduit of fluid 15 or measured on the user.

Preferably, said measure is done through an analysis system plus a time, that can be entered by a technician according to a circuit inertia that calculates the time required to the dosed solution to spread into the circuit itself and reach the analysis system. At the same time, the reading of the flow detector may also be entered.

Basically, the PID dosing depends on three parameters: analysis of the sanitizer concentration, circuit inertia time and flow of water to the users. This allows having a regular dosage while avoiding hyper concentrations in some points of the circuit. The system also includes other analyses that can be entered by the management PLC in regulating the dosage of monochloramine in the fluid to be sanitized, such as: Redox potential, pH, free chlorine, total chlorine, NH3.

In summary, the method for the controlled production of monochloramine for sanitizing fluids involves the following steps:

a. Producing monochloramine, with a PH of between 7 and 12.5, in a reactor 1 and following the reaction in turbulent regime of a first reagent A and a second reagent B and osmotized water C, b. feeding a certain amount of the first reagent A downstream of reactor 1 into the monochloramine produced, c. Dosing said stored monochloramine to the fluid to be sanitized 15.

The step of feeding a certain amount of the first reagent A downstream of reactor 1 can take place:

i. on the transfer piping 13, or ii. directly in the storage tank 12.

The production step involves:

a. dosing the second reagent B; said dosing takes place simultaneously to the entrance of the osmotized water C in reactor 1;

b. once the predefined time has elapsed or the preset level has been reached, while osmotized water C continues to flow to reactor 1, introducing the first reagent A;

c. once the predefined time has elapsed or the preset level has been reached, the osmotized water C continues to flow up to reaching the final level;

during at least one of the above steps, preferably also during the time of preparation and production of the monochloramine of steps a, b and c, a turbulence is created inside the reactor. Said turbulent regime continues even after the formation of monochloramine and can be applied in the reaction reactor 1 or in the storage tank 12.

Description of the Reactor

Generally, reactor 1 is a body within which, through intake ducts, reagents A and B can be introduced in addition to the osmotized water C and in which an orifice is further provided that is configured to receive the mixing means 2 to generate turbulence in the reaction solution.

In one embodiment, the mixing means 2 are a stirring device or a mixer, placed axially or centrally with respect to the cylindrical body of reactor 1.

Figure 3:
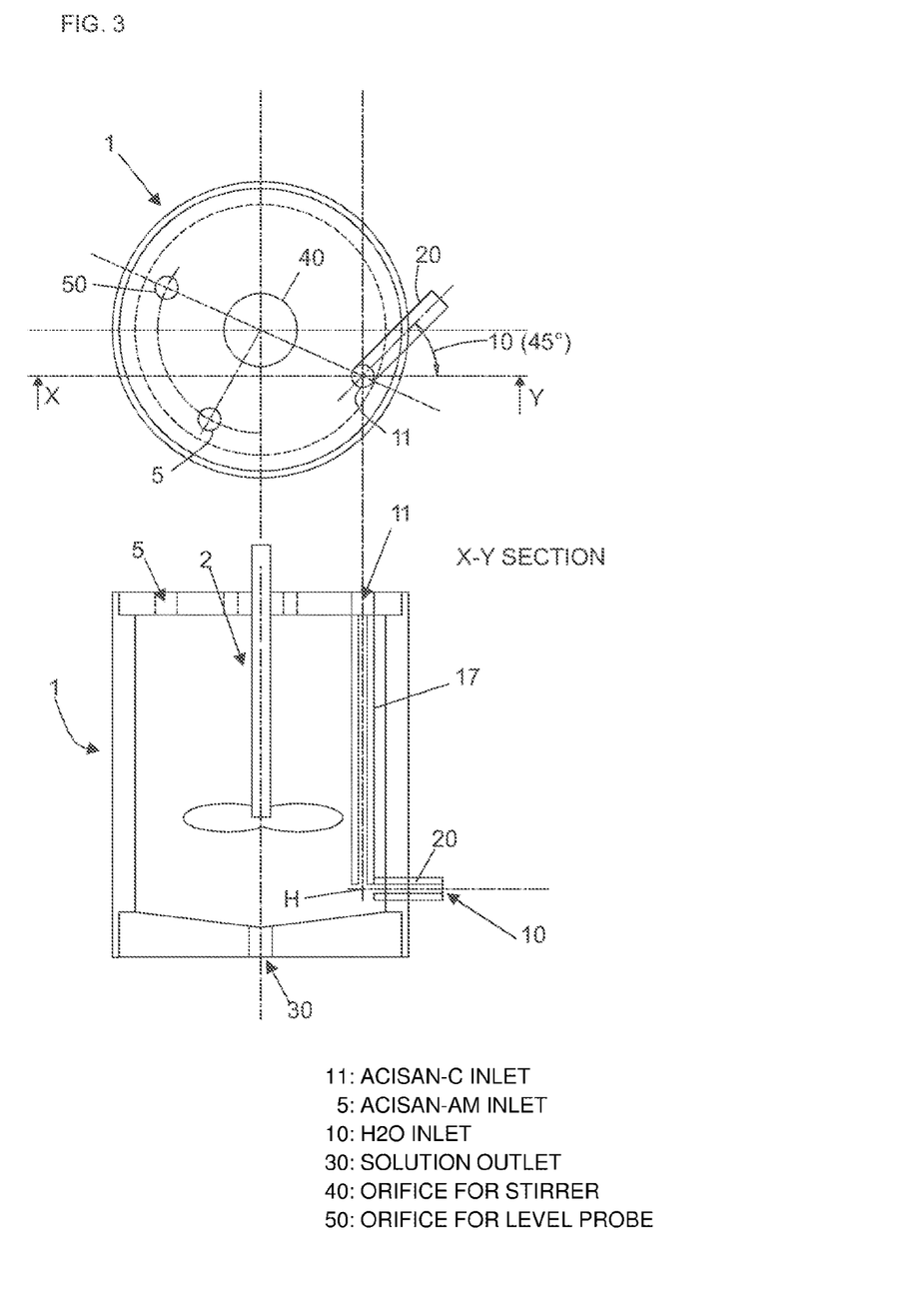
FIG. 3: shows a preferred configuration of the reaction reactor with dislocation of the inlets of reagents and osmotized water, plus in addition to the presence of a stirring means.

According to an aspect of the invention, a possible embodiment of reactor 1 is shown in FIG. 3.

In a preferred embodiment, it is basically a cylindrical container closed at the base ends, at the lower base whereof there is an outlet mouth for the connection to the storage tank 12 of the monochloramine produced.

The reaction reactor 1 is indicated in particular in FIG. 3;

Reactor 1 is provided with at least a first, a second and a third feeding device.

The osmotized water C enters into orifice 10 by micrometric adjustment on loading solenoid valve indicated with EV1 (FIG. 1).

As said, reactor 1 also includes two further inlets of the first and second reagent A and B previously described and adapted to take part in the reaction.

Moreover, reactor 1 includes, as mentioned, the further orifice for positioning the mixing means 2 of the reaction solution, i.e. forced mixing; according to a preferred embodiment, said mixing means 2 are for example an electromechanical stirrer, bearing at least one stem ending with blades that by rotating immersed in the solution cause the indicated turbulence thereof.

In more detail, the upper base of reactor 1 has:
at least two openings 11 and 5 through which reagents A and B (ACISAN C and ACISAN-AM) enter, respectively,
at least one orifice 50 shaped to accommodate a level probe; alternatively, without leaving the scope of protection of the present invention, the level probe is external to reactor 1 and in this case, orifice 50 can be omitted or can serve for other probes,
at least one orifice 40, preferably arranged in axis to the reactor, shaped for coupling with the mixing group 2.

The inlet 10 of the osmotized dilution water 10 is located in the cylindrical side jacket of the reactor and is defined by a conduit 20, not perpendicular to the jacket, i.e. arranged in a non-radial direction.

According to the top view of rector 1, said conduit 20 forms an angle of 45° with respect to the tangent of the insertion point with point H where the osmotized water C is released into the reactor.

Point H lies within the reactor, in the lower area and adjacent to the jacket, but away from it.

The first reagent A is also introduced into the reactor in the vicinity of point H, with introduction from the top and continuation through dedicated conduit 17 up to reaching an outlet area corresponding to said point H, so as to have an axial direction with respect to the reactor.

The second reagent B is introduced into the reactor in orifice 5 of the reactor itself.

As mentioned, in orifice 40, preferably central, are placed the mixing means 2 (i.e. electromechanical, without limitation), the level sensor is placed in orifice 50.

Therefore, while the inlet of reagents A and B is in the same axial direction from the top of reactor 1, the inlet of the osmotized water C is in a plane parallel to the base of reactor 1. Said geometry if reactor 1 and arrangement of the inlets of the first and second reagent A and B and of the osmotized water C promotes the reaction of the same and contributes, along with the mixing means 2, to generate turbulence for mixing and formation of monochloramine.

Description of the Plant

The plant for the regulated production of monochloramine, in addition to at least one reactor 1 as described above, is completed by:
at least the storage tank 12, connected to said at least one reactor by means of a dedicated conduit 13, and valve Ev2,
a first, second and third feeding device configured to feed and dose reagents A and B in the reactor, connected to tanks 6 and 7 by relative conduits, and the osmotized water C,
a reaction control and management system,
a post-dosing system, or a fourth feeding device 16 configured to withdraw the first reagent A, ACISAN C, and feed and dose, if needed:
in the storage tank 12, or
on the transfer piping 13 of reactor-storage tank 12,
dosing pumps, for dosing the monochloramine solution,
one or more probes for measuring representative quantities inside the reactor and/or the storage tank.

A pressure reducer is configured to adjust the inlet pressure of the water intended for the reaction solution in order to keep it between values adjustable between 1 and 10 bar.

As mentioned above, if it is impossible to have a supply of osmotized water C with which to proceed with the reaction, the system object of the invention provides that the water inlet line is provided with a further osmotic group; in detail, said group comprises a pump placed inside the osmosis system, which takes water at the pressure reduced by the pressure reducing valve and pressurize it to overcome the osmotic pressure (pressure needed to push the water through the osmotic membranes) giving the residue needed to feed the reaction solution.

Basically, therefore, the plant object of the present invention comprises:
a. a reactor 1 in which the reaction between the first reagent A, the second reagent B and osmotized water C is conducted to produce a first concentrated solution of monochloramine M,
b. a first, a second and a third feeding device for feeding the first reagent A, the second reagent B and the osmotized water C, respectively, in said reactor 1,
c. at least one storage tank 12 for collecting a final solution of concentrated monochloramine M1 produced.

In particular, according to one aspect of the invention, the plant further comprises:
i. mixing means 2 configured to create a turbulence within said reactor 1, where in a preferred embodiment, said mixing means 2 are of the electromechanical type.

ii. a fourth feeding device 16 for feeding the first reagent A downstream of said reactor 1 in the first concentrated solution of monochloramine M produced, iii. a control system, in signal connection with the plant components configured to carry out at least the operations necessary for the reaction and production of the first concentrated solution of monochloramine M produced and for controlling the downstream feeding of reactor 1 for the final solution of concentrated monochloramine M1.

According to possible embodiments, the fourth feeding device 16 feeds the first reagent A between reactor 1 and the storage tank 12.

A further possible embodiment provides that the fourth feeding device 16 feeds the first reagent A in the storage tank 12.

Said storage tank 12 preferably comprises a mixing device 21 placed therein and adapted to facilitate the reaction between the ammonium excess leaving reactor 1 and the further amount of the first reagent A introduced downstream of reactor 1. Said mixing device 21 preferably is of the electromechanical type.

According to one aspect of the invention, the fourth feeding device 16 is configured to inject the reagent A during the transfer into the storage tank 12 following the opening of a solenoid valve EV2 on the transfer piping 13 with due mixing or directly into the storage tank 12 on which a mixing system can be inserted.

According to one aspect of the invention, if osmotized water is not available, the plant comprises a filtration group on osmotic membranes configured to produce the osmotized water C of only the portion intended for the reaction.

With this plant, the first solution and the final solution of concentrated monochloramine M and M1 produced have pH values of between 7 and 12.5.

The final solution of concentrated monochloramine M1 is introduced in fluid 15 to be sanitized using suitable dosing means.

The invention claimed is:

1. A method for controlled production of monochloramine for sanitizing fluids, comprising the steps of:
   a. producing monochloramine by a reaction of a first reagent and a second reagent and osmotized water at a pH of between 7 and 12.5 in a turbulent flow regime of a reactor,
   b. feeding an additional amount of the first reagent downstream of the reactor of step (a) into the monochloramine produced, and
   c. dosing the produced monochloramine of step (b) to a fluid to be sanitized.

2. The method according to claim 1, wherein the step of feeding an additional amount of the first reagent downstream of the reactor is carried out:
   i. into a transfer piping, or
   ii. directly into a storage tank.

3. The method according to claim 1, wherein:
   d. said feeding the second reagent into the reactor takes place simultaneously with said feeding the osmotized water into the reactor;
   e. said feeding the first reagent into the reactor
      1) begins once a predefined time of said feeding osmotized water into the reactor has elapsed, and
      2) continues for so long as said feeding osmotized water continues; and
   f. once said predefined time has elapsed, said feeding osmotized water into the reactor continues until the level in the reactor reaches a final level.

4. The method according to claim 1, wherein the turbulent flow regime continues even after the step of producing monochloramine.

5. A method for the controlled production of monochloramine for sanitizing fluids, comprising the steps of:
   a1. feeding a first reagent through a first reagent orifice into a reactor, feeding a second reagent through a second reagent orifice into the reactor, and feeding osmotized water through an osmotized water orifice into the reactor,
   a2. producing monochloramine by a reaction of the first reagent and the second reagent at a pH of between 7 and 12.5,
   b. feeding a certain amount of the first reagent downstream of the reactor of steps (a1) and (a2) into the monochloramine produced in step (a2), and
   c. dosing the produced monochloramine resulting from step (b) to a fluid to be sanitized;
   wherein:
   d. said feeding the second reagent into the reactor takes place simultaneously with said feeding the osmotized water into the reactor;
   e. said feeding the first reagent into the reactor
      1) begins once a predefined time of said feeding osmotized water into the reactor has elapsed, and
      2) continues for so long as said feeding osmotized water continues;
   f. once said predefined time has elapsed, said feeding osmotized water into the reactor continues until the level in the reactor reaches a predefined final level; and
   g. flow within the reactor is turbulent during at least one of steps (d) through (f).

6. A method for the controlled production of monochloramine for sanitizing fluids, comprising the steps of:
   a. producing monochloramine by a reaction of a first reagent and a second reagent and osmotized water at a pH of between 7 and 12.5 in a turbulent flow regime of a reactor, provided that the first reagent enters the reactor through a first reagent orifice, the second reagent enters the reactor through a second reagent orifice, and the osmotized water enters the reactor through a second reagent orifice,
   b. feeding a certain amount of the first reagent downstream of the reactor of step (a) into the monochloramine produced,
   c. dosing the produced monochloramine of step (b) to a fluid to be sanitized;
   wherein the producing step (a) comprises:
   d. dosing the second reagent; with said dosing taking place simultaneously to an entry of the osmotized water into the reactor;
   e. once a preset level has been reached, while the osmotized water continues to flow into the reactor, introducing the first reagent; and
   f. once the preset level has been reached, continuing to flow the osmotized water up to reaching a predefined final level;
   during at least one of the above steps (d) through (f), creating a turbulence inside the reactor.

7. The method according to claim 1, wherein:
   d. said feeding the second reagent into the reactor takes place simultaneously with said feeding the osmotized water into the reactor;
   e. said feeding the first reagent into the reactor
      1) begins once a preset level has been reached in the reactor, and 2) continues for so long as said feeding osmotized water continues;
f. once said preset level has been reached in the reactor, said feeding osmotized water into the reactor continues until the level in the reactor reaches a final level; and
g. flow within the reactor is turbulent during at least one of steps (d) through (f).

\* \* \* \* \*